US009573633B2

(12) United States Patent
Behrens

(10) Patent No.: US 9,573,633 B2
(45) Date of Patent: Feb. 21, 2017

(54) CABIN LIFT LOCKING MECHANISM

(71) Applicant: PREMIER COIL SOLUTIONS, INC., Waller, TX (US)

(72) Inventor: Randall Dean Behrens, Sealy, TX (US)

(73) Assignee: Premier Coil Solutions, Inc., Waller, TX (US)

(*) Notice: Subject to any disclaimer, the term of this patent is extended or adjusted under 35 U.S.C. 154(b) by 0 days.

(21) Appl. No.: 14/881,735

(22) Filed: Oct. 13, 2015

(65) Prior Publication Data

US 2016/0091137 A1 Mar. 31, 2016

Related U.S. Application Data

(63) Continuation-in-part of application No. 14/454,948, filed on Aug. 8, 2014.

(51) Int. Cl.
*E21B 7/02* (2006.01)
*B62D 33/063* (2006.01)

(52) U.S. Cl.
CPC ................................ *B62D 33/0636* (2013.01)

(58) Field of Classification Search
CPC ........ B60P 1/045; B65G 69/2823; B66F 7/08; B66F 7/0641; B66F 11/042; B66F 7/0691; B66F 1/025; B66F 7/22; E21B 15/00;E21B 7/023; E21B 7/02; E21B 15/003
See application file for complete search history.

(56) References Cited

U.S. PATENT DOCUMENTS

| | | | | |
|---|---|---|---|---|
| 4,489,526 A * | 12/1984 | Cummins | E21B 15/00 182/141 |
| 5,881,414 A * | 3/1999 | Alexander | B65G 69/001 14/71.1 |
| 2008/0250767 A1* | 10/2008 | Boyko | A01B 73/044 56/14.7 |
| 2008/0307717 A1* | 12/2008 | Heppner | A01M 31/025 52/64 |
| 2009/0218138 A1* | 9/2009 | Donnally | E21B 15/00 175/57 |
| 2012/0181735 A1* | 7/2012 | Ooe | B62D 65/18 269/17 |

* cited by examiner

*Primary Examiner* — Kipp Wallace
(74) *Attorney, Agent, or Firm* — Lloyd L. Davis; Andrews Kurth Kenyon LLP

(57) ABSTRACT

A cabin unit mounted on a horizontal platform includes a mechanism for locking the cabin unit when in a raised position above the horizontal platform. The locking mechanism includes an articulated member attached between the cabin unit and the horizontal platform, the articulated member including an upper support arm and a lower support arm coupled at a joint and a cylinder attached between the horizontal support and the articulated member. A cylinder arm is retracted to move the joint of the articulated member to a locked position while the cabin is in a raised position.

5 Claims, 4 Drawing Sheets

50
55
55
102
100
104
101
108

CABIN LIFT LOCKING MECHANISM

CROSS-REFERENCE TO RELATED APPLICATIONS

This application is a continuation-in-part and claims benefit under 35 U.S.C. 120 of U.S. application Ser. No. 14/454,948, filed Aug. 8, 2014, which is incorporated herein by reference in its entirety.

FIELD

Embodiments disclosed herein relate to a coiled tubing unit, more particularly, a cabin lift locking mechanism.

BACKGROUND AND SUMMARY

A coiled tubing unit dispenses coiled tubing into and out of a wellbore from a reel unit. The coiled tubing unit also includes a control center where an operator is located to operate the reel unit as coiled tubing is inserted into or taken out of the wellbore. In certain instances, the control center is a cabin unit mounted at or near a front end of the coiled tubing unit, e.g., a trailer, and the cabin unit is raised to provide the operator a "birds eye" view of the operations.

In one aspect, embodiments disclosed herein relate to a cabin unit mounted on a horizontal platform and a mechanism for locking the cabin unit in a raised position above the horizontal platform, the mechanism comprising an articulated member attached between the cabin unit and the horizontal platform, the articulated member including an upper support arm and a lower support arm coupled at a joint, and a cylinder attached between the horizontal support and the articulated member, wherein an arm of the cylinder is retracted to move the joint of the articulated member to a locked position while the cabin is in a raised position.

BRIEF DESCRIPTION OF THE DRAWINGS

The invention is illustrated in the accompanying drawings wherein.

DETAILED DESCRIPTION

Figure 1:
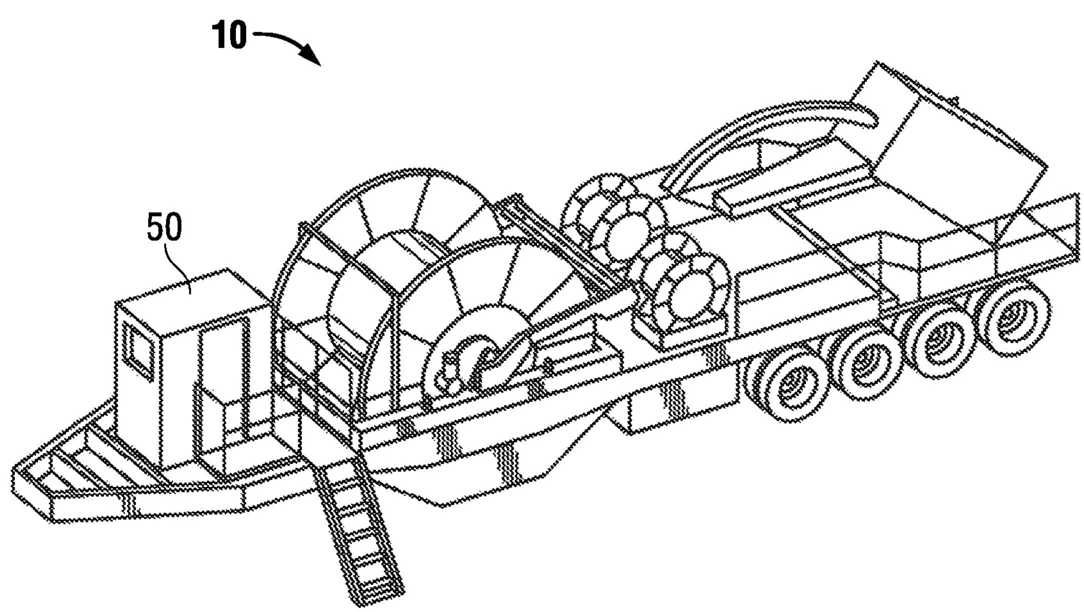
FIG. 1 illustrates a coiled tubing unit.

A cabin unit locking mechanism is disclosed. The cabin unit locking mechanism may be on a coiled tubing unit, for example, as shown in FIG. 1. The coiled tubing unit may include a complete set of equipment necessary to perform standard continuous-length tubing operations in the field. For example, the coiled tubing unit may comprise a reel for storage and transport of coiled tubing, an injector head to provide surface drive force to run and retrieve coiled tubing, a control cabin from which an equipment operator may monitor and control the coiled tubing, and a power pack to generate hydraulic and pneumatic power required to operate the coiled tubing unit. The coiled tubing unit may further comprise other equipment for continuous-length or coiled tubing operations in the field. Moreover, in certain embodiments the coiled tubing unit may comprise onshore coiled tubing units such as a truck mounted coiled tubing unit or larger trailer mounted coiled tubing units. Still further, in other embodiments the coiled tubing unit may comprise offshore coiled tubing units such as those mounted on a lift boat, barge, offshore platform or any other offshore structure. The locking mechanism disclosed herein may be used with any lifting mechanism on any type of coiled tubing equipment that is or may be raised and lowered, including but not limited to, support trailers, offshore cabin skids, and pumping units.

A cabin unit may be mounted on or above a horizontal platform mounted on a truck or trailer. The locking mechanism disclosed herein is associated with raising and lowering of the cabin unit relative to the horizontal platform with hydraulic cylinders for use or transport. In the event hydraulic cylinders are used to raise the cabin unit, the locking mechanism fully supports the weight of the cabin unit without the need for hydraulic pressure in the lifting cylinders. Thus, a loss of hydraulic power does not adversely affect the system.

The locking mechanism includes an articulated member. The articulated member may have a joint coupling first and second arms of the member. For example, the joint may include a pin inserted through holes in the arms of the articulated member, or any other type of joint. The first arm may be connected to a pivot point (e.g., pinned or otherwise) on the cabin unit at an end opposite the joint. The second arm may be connected to a pivot point (e.g., pinned or otherwise) on the horizontal platform at an end opposite the joint.

The locking mechanism further includes a cylinder having an extendable arm. The cylinder may be attached between the horizontal platform and the articulated member. For example, the cylinder may be attached at a pivot point (e.g., pinned or otherwise) of the horizontal platform and a pivot point (e.g., pinned or otherwise) on the second arm of the articulated member. Alternatively, the cylinder could be attached at a pivot point (not shown) on the first arm. In one embodiment, the cylinder may be a hydraulic cylinder in fluid communication at any pressure with a hydraulic fluid source. In other embodiments, the cylinder may be pneumatic or electric. In yet other embodiments, the cylinder may be mechanical. The locking mechanism may include one or more extendable cylinders and articulated members on each side of the cabin unit.

Figure 2A:
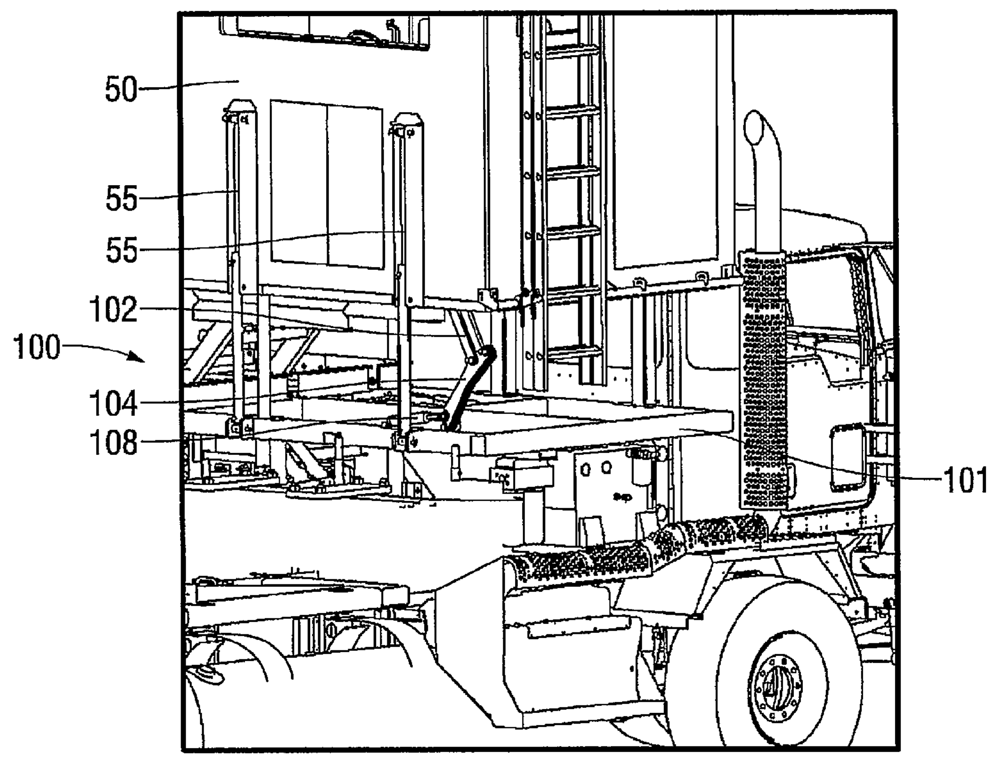
FIG. 2A illustrates a perspective view of an embodiment of a cabin unit locking mechanism in a semi-collapsed position.
Figure 2B:
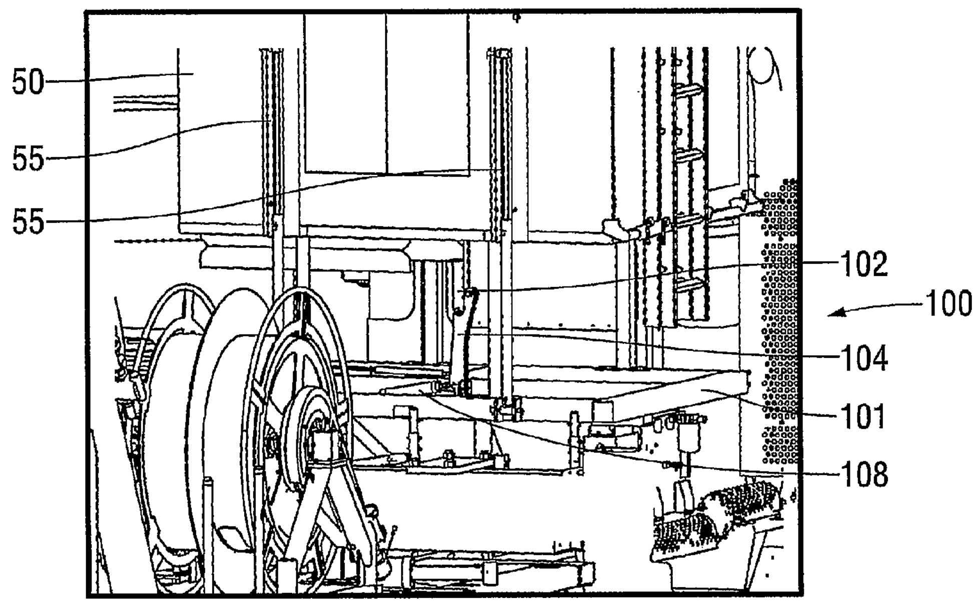
FIG. 2B illustrates a perspective view of an embodiment of a cabin unit locking mechanism in a locked position.

FIGS. 2A-B illustrate perspective views of an embodiment of a cabin unit locking mechanism 100. A cabin unit 50 is mounted on or above a horizontal platform 101 or any commonly known weldment or structure by any means. The locking mechanism 100 includes an upper arm 102 and a lower arm 104 coupled together, and a cylinder 108 attached to at least one of the arms. A cabin lift system may include hydraulic cylinders 55 operable to raise and lower the cabin unit 50 relative to the horizontal platform 101. During transport or at other times of nonuse, the cabin unit 50 is in the collapsed position resting on the horizontal platform 101. Prior to beginning the coiled tubing operations, the cabin unit is raised to provide the operator a "birds eye" view of the operations.

Figure 3A:
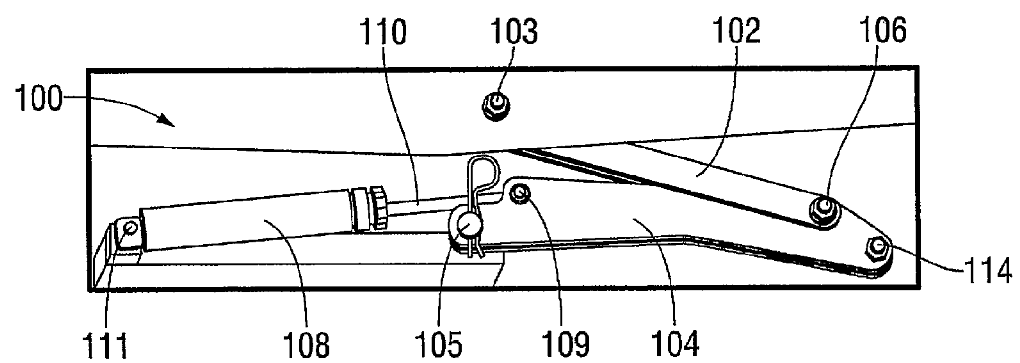
FIGS. 3A-C illustrate side views of multiple positions of a cabin unit locking mechanism.
Figure 3B:
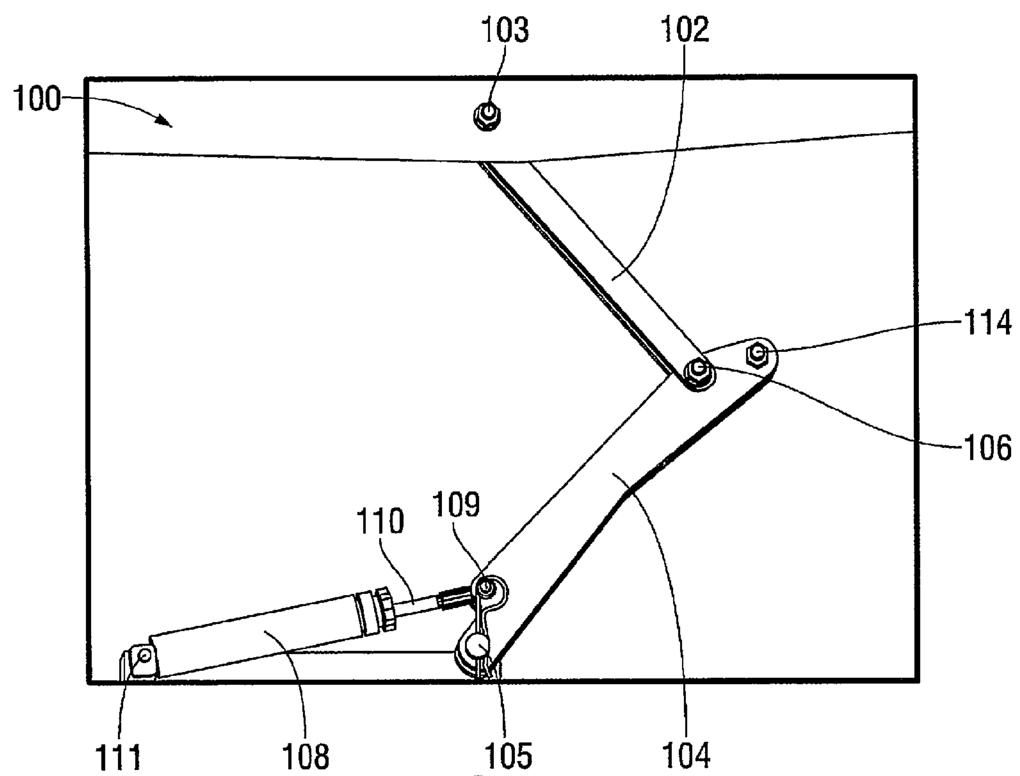
Figure 3C:
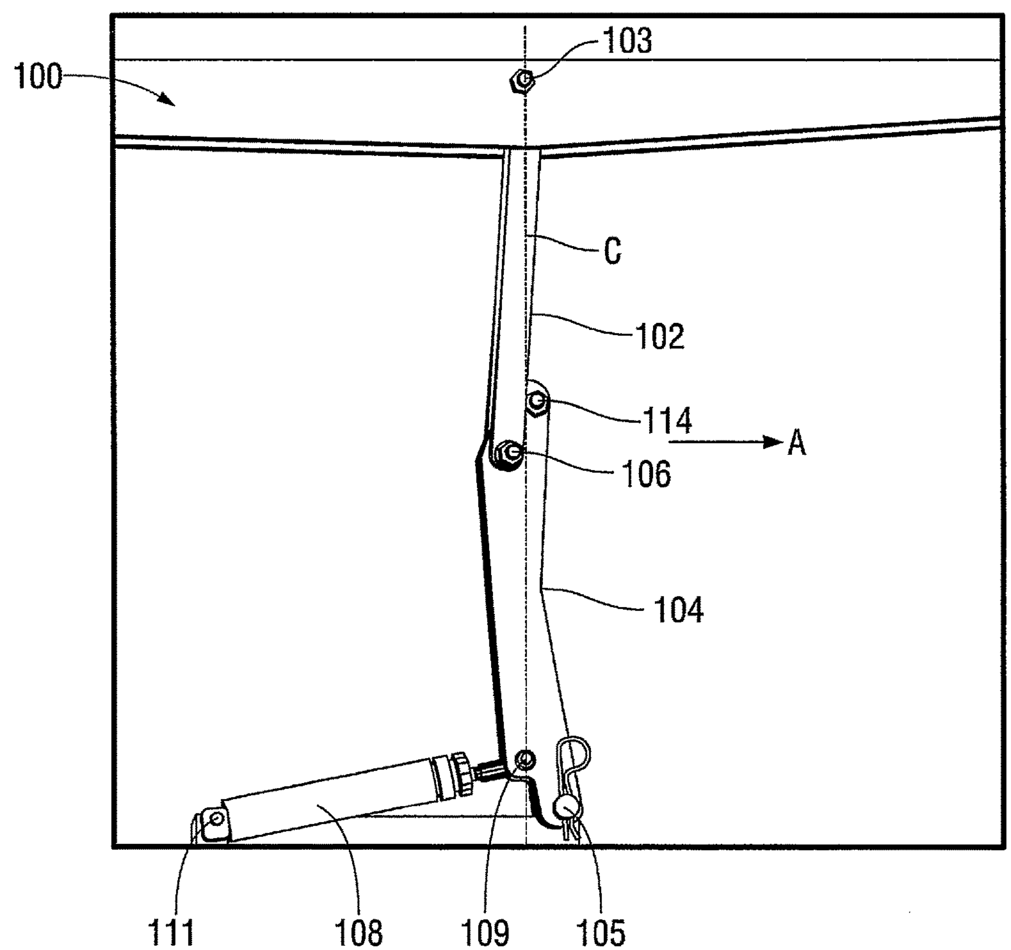

FIGS. 3A-C illustrate more detailed side views of an embodiment of the cabin unit locking mechanism 100 in FIGS. 2A-B. The locking mechanism 100 includes a first or upper support arm 102 and a second or lower support arm 104 coupled at a joint 106. For example, the joint 106 may include a pin inserted through holes in the arms of the articulated member, or any other type of joint. The upper support arm 102 is connected to a pivot point 103 (e.g., pinned or otherwise) on the cabin unit at an end opposite the joint 106. The lower support arm 104 is connected to a pivot point 105 (e.g., pinned or otherwise) on the horizontal platform 101 at an end opposite the joint 106.

The locking mechanism 100 further includes a cylinder 108 having an extendable arm 110. The cylinder 108 may be attached between the horizontal platform 101 and one of the upper arm 102 or the lower arm 104. For example, the cylinder 108 may be attached at a pivot point 111 (e.g., pinned or otherwise) of the horizontal platform 101 and a pivot point 109 (e.g., pinned or otherwise) on the lower arm 104. Alternatively, the cylinder 108 could be attached at a pivot point (not shown) on the upper arm 102. In one embodiment, the cylinder 108 may be a pneumatic cylinder. In other embodiments, the cylinder 108 may be hydraulic or electric. In yet other embodiments, the cylinder 108 may be mechanical, e.g., a threaded extendable rod. The locking mechanism 100 may include one or more extendable cylinders and articulated members on each side of the cabin unit.

FIG. 3A illustrates a fully collapsed position of the locking mechanism 100. The cylinder arm 110 of the cylinder 108 is fully extended and the upper and lower arms 102, 104 are mechanically folded together in a compact manner. FIG. 3B illustrates a partially unfolded or extended position of the locking mechanism 100 as the cabin unit 50 is raised by the cylinders 55 (FIGS. 2A-B) of the cabin lift system. As the cabin unit 50 is raised, the upper and lower arms 102, 104 unfold, and the cylinder arm 110 of the cylinder 108 is retracted. The cylinder 108 may include an internal spring (not shown) that increases a pulling force on the joint 109 to unfold and extend upper and lower arms of the locking mechanism 100.

FIG. 3C illustrates a fully unfolded, extended and locked position of the locking mechanism 100. When the cabin unit is fully raised, the cylinder arm 110 is fully retracted and pulls joint 106 between the upper and lower support arms 102, 104 past a centerline "C" formed along a length of the fully extended upper and lower arm supports. In the "over center" position, the upper support arm 102 mechanically engages an upper end 114 of the lower support arm 104. In the view shown in FIG. 3C, the joint 106 is to the left of the centerline C in the locked, over center position. With the upper and lower support arms locked in place over center, the cabin unit rests on the locking mechanism joint rather than the hydraulic lift system used to raise the cabin unit.

To unlock the locking mechanism, the hydraulic cylinders 55 are actuated to raise the cabin unit slightly, and the cylinder arm 110 attached to the upper and lower support arms is extended slightly until the joint 106 of the locking mechanism passes the centerline "C" (in the direction of arrow "A" in FIG. 3C) and the locking mechanism begins to mechanically fold. That is, in the view shown in FIG. 3C, the joint 106 moves to the right of the centerline C. The operator then actuates the cabin lift system to lower the cabin unit.

Advantageously, embodiments disclosed herein provide a safe and efficient automatic locking mechanism to allow the cabin unit to be locked in place without relying on the methods or means that were used to raise the cabin. For example, in prior systems, the hydraulic lift system, that is hydraulic cylinders, used to raise the cabin unit also support the cabin unit while in the raised position. In the event of a hydraulic pressure loss, the hydraulic lift system would no longer support the cabin unit, and the cabin unit may fall. In another example of prior systems, the safety locks are rotating steel plates that have to be manually positioned after the cabin unit is raised. If the manual mechanical locks are forgotten and not moved into position then, in the event of a hydraulic pressure loss, the hydraulic lift system no longer supports the cabin unit, and the cabin unit may fall.

The claimed subject matter is not to be limited in scope by the specific embodiments described herein. Indeed, various modifications of the invention in addition to those described herein will become apparent to those skilled in the art from the foregoing description. Such modifications are intended to fall within the scope of the appended claims.

What is claimed is:

1. A coiled tubing unit comprising:

A first mechanism configured to raise or lower a cabin unit relative to a horizontal platform of the coiled tubing unit a second mechanism for locking the cabin unit in a raised position above the horizontal platform, wherein the second mechanism is operable independent of the first mechanism, the second mechanism comprising:

an articulated member attached between the cabin unit and the horizontal platform, the articulated member including an upper support arm and a lower support arm coupled at a joint; and a cylinder attached between the horizontal support and the articulated member, wherein an arm of the cylinder is retracted to move the joint of the articulated member to a locked position while the cabin unit is in a raised position.

2. The coiled tubing unit of claim 1, wherein the cylinder of the second mechanism is pneumatic.

3. The coiled tubing unit of claim 1, wherein the cylinder of the second mechanism is mechanical.

4. The coiled tubing unit of claim 1, wherein the cylinder of the second mechanism is hydraulic.

5. The coiled tubing unit of claim 1, wherein the first mechanism comprises hydraulic cylinders operable to raise and lower the cabin unit relative to the horizontal platform.

* * * * *